United States Patent
MacLeod et al.

(10) Patent No.: US 6,434,545 B1
(45) Date of Patent: Aug. 13, 2002

(54) GRAPHICAL QUERY ANALYZER

(75) Inventors: Stewart P. MacLeod, Redmond; Casey L. Kiernan, Kirkland; Manu Vasandani, Bellevue, all of WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 09/213,069

(22) Filed: Dec. 16, 1998

(51) Int. Cl.[7] .............................................. G06F 17/00

(52) U.S. Cl. ............................ 707/3; 707/102; 345/762

(58) Field of Search ............... 707/1–206; 345/761–773

(56) References Cited

U.S. PATENT DOCUMENTS

| | | | | |
|---|---|---|---|---|
| 5,418,944 A | * | 5/1995 | DiPace et al. .................. | 707/3 |
| 5,812,840 A | * | 9/1998 | Shwartz .......................... | 707/4 |
| 5,953,723 A | * | 9/1999 | Linoff et al. ................... | 707/4 |

OTHER PUBLICATIONS www.dbmsmag.com/9701d161.html, as cached in www.google.com.*
www.cai.com/products/db2/plananalyzer/factsheet.htm.*

* cited by examiner

Primary Examiner—David Jurg
(74) Attorney, Agent, or Firm—Woodcock Washburn LLP

(57) ABSTRACT

A user specifies one or more queries comprising a batch of SQL statements. Each query submitted is displayed and represented as a tree, with each operation in the execution plan for the query represented by a corresponding tree node. This representation intuitively conveys the DBMS execution strategy which would be used to process the queries. The tree nodes are displayed as icons, with a unique one of such icons corresponding respectively to each of the possible query operations. In addition, the computing cost of each operation (each node) as a percentage of overall query cost is displayed, as is the cost of each query as a percentage of the overall cost of the specified query batch. A user may select an operation (tree node) with a conventional mouse, whereupon a user interface will show more detailed cost statistics relating to the selected operation.

18 Claims, 11 Drawing Sheets

GRAPHICAL QUERY ANALYZER

TECHNICAL FIELD

The present invention relates generally to the field of query processors conventionally used to manipulate and retrieve data from databases. More particularly, the present invention relates to a system and method for displaying an intuitive, graphical representation of query execution, including detailed computational cost statistics.

BACKGROUND OF THE INVENTION

The databases which enterprises use to maintain information naturally grow over time. Thus, database manipulation often requires operations involving large scale computing costs and undesirable delays.

As a result, the efficiency of database applications is of particular interest to database administrators and application developers. At the same time, the computer languages most often used for such applications, particularly in the relational database context, do not especially lend themselves to efficiency improvements. In particular, Structured Query Language (SQL) and similar query languages consist of high level commands, often referred to as "queries," which typically describe a data set to be retrieved, selected or otherwise processed. While such programming environments allow the specification of data selection using constructs similar to natural English, they do not allow developers to specify the actual procedure used to accomplish the data selection. Thus, performance (i.e. efficiency) enhancement via DML statement revision alone is generally difficult to achieve.

In an effort to address these problems, some DBMS include graphical "show plans". These allow a developer to specify a query and, without actually executing the query, view graphically the actual steps which would have been performed in achieving the specified data selection had the query been executed. More particularly, these show plans provide a means for visualizing a query's physical execution strategy. These plans may also provide the query's "cost" (i.e., an indication of the computational resources which would be consumed by the DBMS during query execution). The developer can then use this information to determine whether to actually implement the query analyzed.

Unfortunately, aside from a general indication of query cost, such "show plans" provide little in the way of the computational cost statistics. This lack of detail significantly limits the usefulness of such show plans in improving application performance. In particular, performance problems tend to arise from very specific causes (e.g., querying an insufficiently maintained or improperly designed database table). Thus, a general indication of the cost of queries, which typically hide numerous operations (e.g., scan, sort) involving multiple tables, is unlikely to indicate the source of a performance problem, or suggest how a query, application or database should be revised.

In short, what is needed is query analyzer providing detailed query cost information, including information specific to particular query operations, all in graphical representation designed to convey intuitively the source of performance problems.

SUMMARY OF THE INVENTION

The present invention addresses these needs. It allows a user to specify a batch of queries and view a tree-structure representation of the queries' execution plan (i.e. operations which will be executed). The graphical display of the present invention is designed to pictorially convey a maximum of information relating to query execution. In particular, each query is represented by a tree and each query operation belonging to a query is represented by a corresponding tree node.

Tree nodes are displayed to convey execution ordering intuitively so that, for example, a parent node will typically correspond to an operation calling another operation (i.e. represented as the child). In addition, because all defined query operations are preferably assigned a corresponding unique icon symbol, the operations which will be executed can be determine from the display alone.

To further improve the usefulness of the display as an analysis tool, the display shows the computational cost of each operation (i.e., at each node) as a percentage of overall query cost, and the cost of each query as a percentage of the overall cost of the specified batch. Thus, a developer can almost immediately narrow the search for the cause of performance problems. With a view to conveying still more information pictorially, the graphical analyzer of the present invention may display tree branches (i.e., an operation's connection to a parent) with widths bearing a mathematical relation (e.g., logarithmic) to the operation's cost.

If while using the display the user identifies a promising area for further investigation (e.g. a particular query operation), the user may select the operation (e.g., via a conventional "mouse" pointer), whereupon the user interface will show more detailed cost statistics relating to the selected operation. These may include, for example, the estimated number of database rows output by the operator, as well as estimated Input/Output (I/O) and CPU activity costs etc.

Providing still further advantages, the graphical display of the present invention may be enabled during normal application execution. By choosing this option, a developer is more likely to trouble-shoot the cause of a problem which manifests itself during such normal application use.

Moreover, the present invention may also incorporate one or more processes which detect missing indices and statistics relating to tables involved in the displayed execution plan. Database table indices and statistics are described in the detailed description below. Briefly however, database statistics comprise information stored in a database relating to a table's characteristics (e.g., number of rows). Indices are associative structures which, for example, facilitate rapid seek operations in relational database tables. In both cases, the query processor may utilize such enhanced information to formulate an execution plan characterized by improved performance.

Upon detection of missing indices or statistics, the query analyzer of the present invention may prompt a user to add such information. Thus, even where the developer fails to locate the source of a performance problem, the query analyzer of the present invention may facilitate semi-automatic enhancement of query performance.

Further benefits and advantages of the present invention will be made apparent in the more detailed description below.

BRIEF DESCRIPTION OF THE DRAWINGS

Other features of the invention are further apparent from the following detailed description of presently preferred exemplary embodiments of the invention taken in conjunction with the accompanying drawings, of which.

DETAILED DESCRIPTION OF THE INVENTION

Exemplary Operating Environment

1. A Computer Environment

Figure 1:
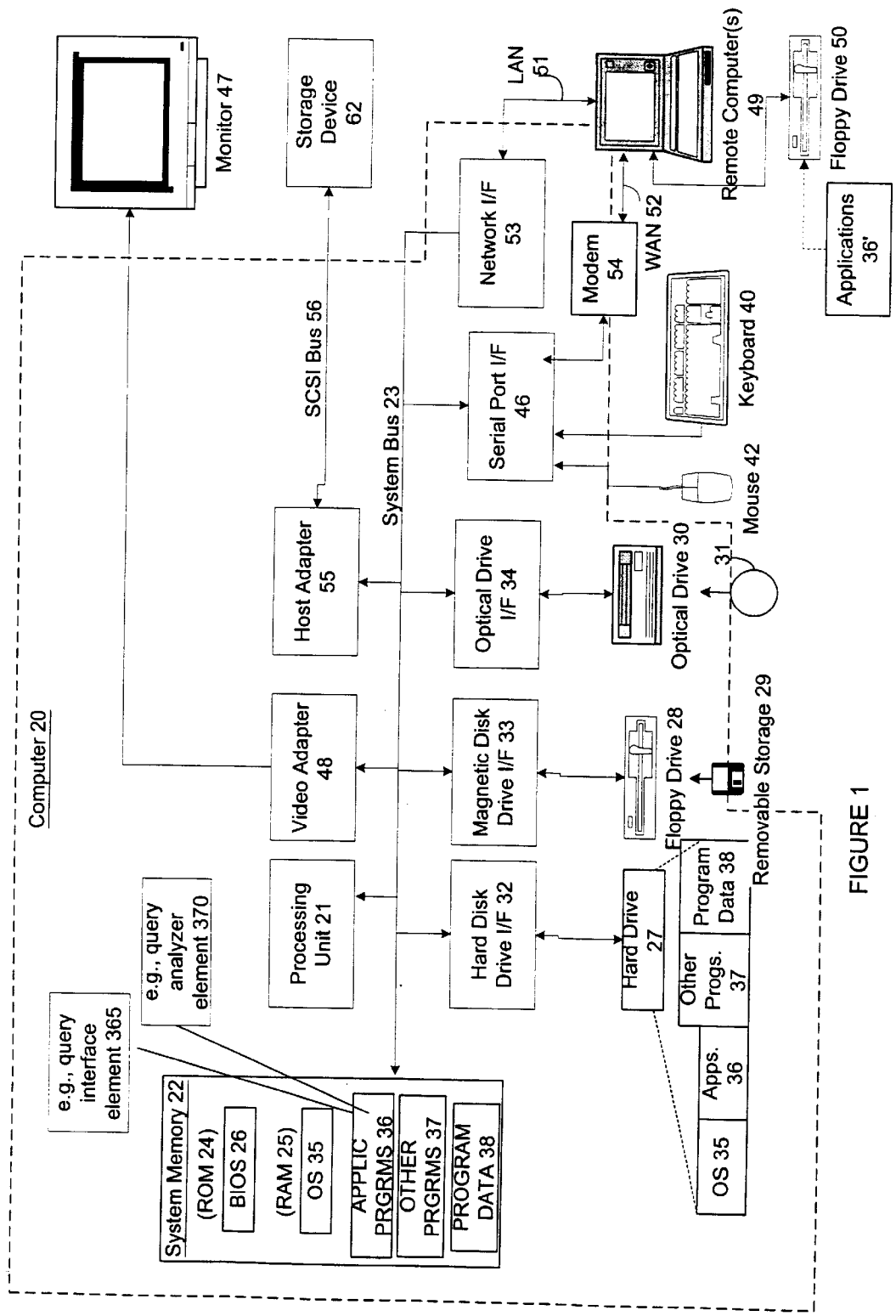
FIG. 1 is a block diagram representing a computer system in which aspects of the present invention may be incorporated.

FIG. 1 and the following discussion are intended to provide a brief general description of a suitable computing environment in which the invention may be implemented. Although not required, the invention will be described in the general context of computer-executable instructions, such as program modules, being executed by a computer, such as a workstation or server. Generally, program modules include routines, programs, objects, components, data structures and the like that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCS, minicomputers, mainframe computers and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read-only memories (ROMs) and the like may also be used in the exemplary operating environment. Further, as used herein, the term "computer readable medium" includes one or more instances of a media type (e.g., one or more floppy disks, one or more CD-ROMs, etc.).

A number of program modules may be stored on the hard disk, magnetic disk 29, optical disk 31, ROM 24 or RAM 25, including an operating system 35, one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite disk, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, Intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

2. A Network Environment

Figure 2:
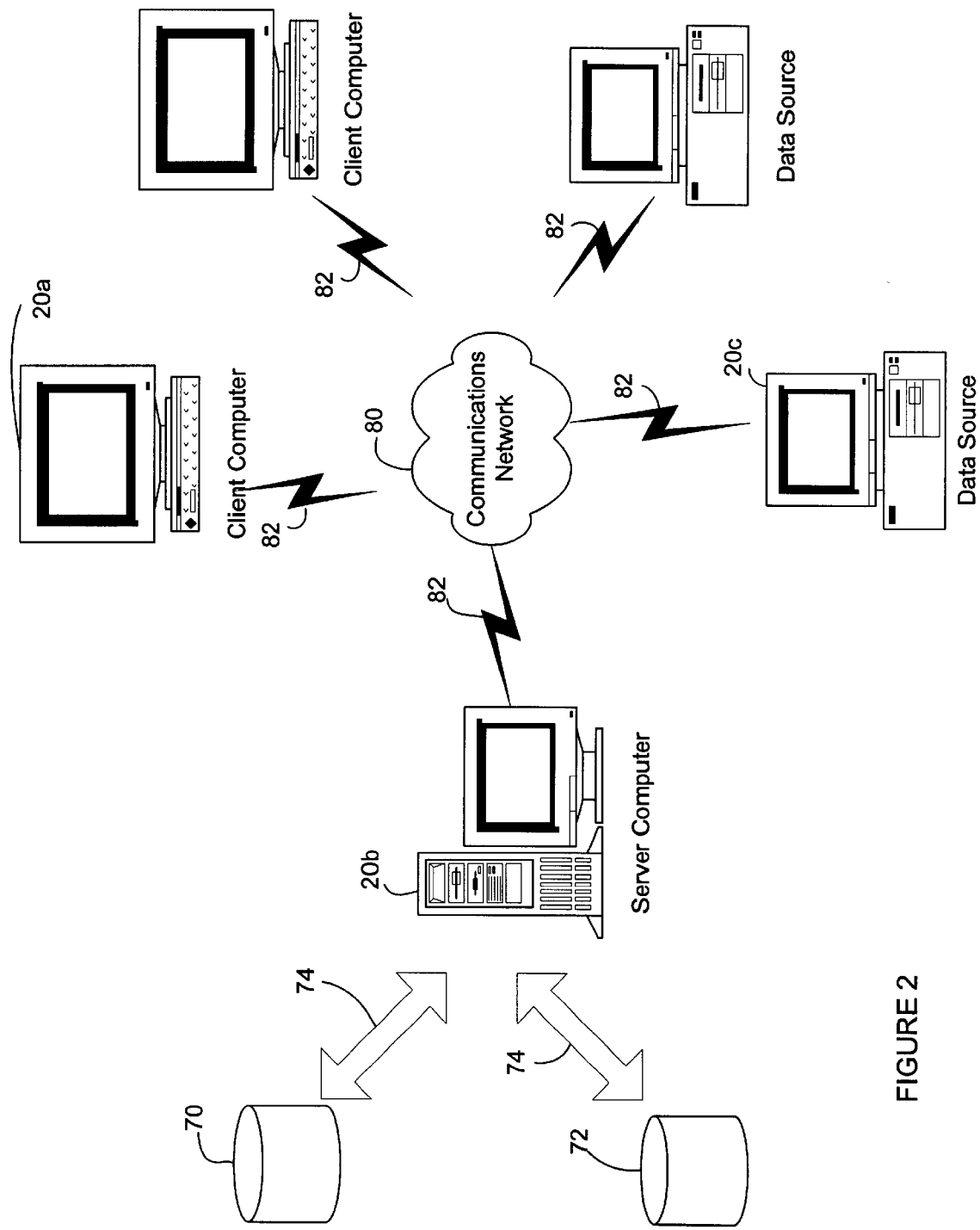
FIG. 2 is schematic diagram representing a network in which aspects of the present invention may be incorporated.

FIG. 2 illustrates an exemplary network environment in which the present invention may be employed. Of course, actual network and database environments can be arranged in a variety of configurations; however, the exemplary environment shown here provides a framework for understanding the type of environment in which the present invention operates.

The network may include client computers 20a, a server computer 20b, data source computers 20c, and databases 70, 72a, and 72b. The client computers 20a and the data source computers 20c are in electronic communication with the server computer 20b via communications network 80, e.g., an Intranet. Client computers 20a and data source computers 20c are connected to the communications network by way of communications interfaces 82. Communications interfaces 82 can be any one of the well-known communications interfaces such as Ethernet connections, modem connections, and so on.

Server computer 20b provides management of database 70 by way of database server system software, described more fully below. As such, server 20b acts as a storehouse of data from a variety of data sources and provides that data to a variety of data consumers.

In the example of FIG. 2, data sources are provided by data source computers 20c. Data source computers 20c communicate data to server computer 20b via communications network 80, which may be a LAN, WAN, Intranet, Internet, or the like. Data source computers 20c store data locally in databases 72a, 72b, which may be relational database servers, excel spreadsheets, files, or the like. For example, database 72a shows data stored in tables 150, 152, and 154. The data provided by data sources 20c is combined and stored in a large database such as a data warehouse maintained by server 20b.

Client computers 20a that desire to use the data stored by server computer 20b can access the database 70 via communications network 80. Client computers 20a request the data by way of SQL queries (e.g., update, insert, and delete) on the data stored in database 70.

3. Database Architecture

Figure 3:
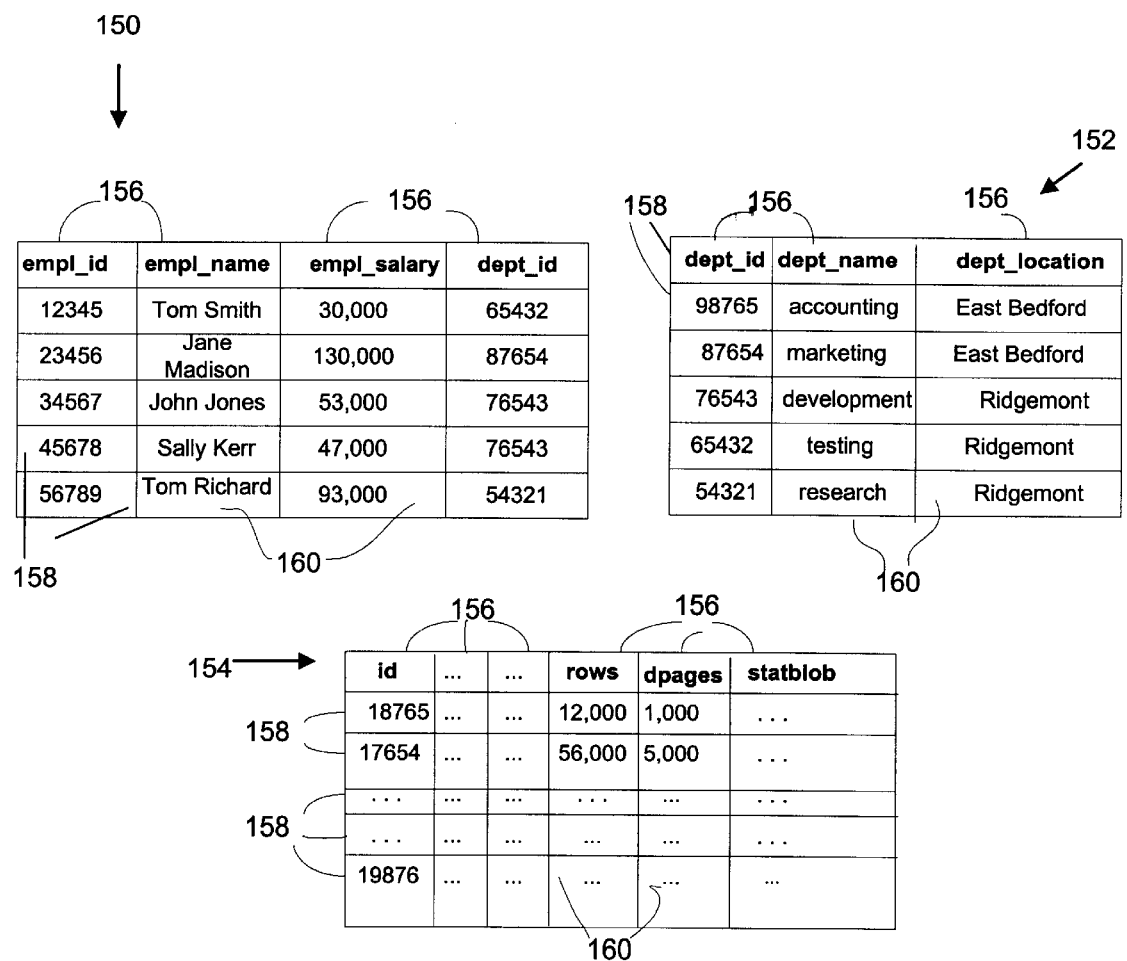
FIG. 3 depicts a portion of the tables located in an exemplary relational database.

FIG. 3 depicts a portion of the tables located in an exemplary relational database. As shown, the exemplary database comprises employee table 150, department table 152, and sysindexes table 154. Each table comprises columns 156 and rows 158 with fields 160 formed at the intersection. Employee table 150 comprises multiple columns 158 including empl_id, empl_name, dept_id, and empl_salary. Columns 158 in department table 152 include dept_id, dept_name, and dept_location. Sysindexes table 154 contains information regarding each table in the database. For example, statistics information such as is described below is stored in sysindexes table 154 along with other information related each table.

Generally, data stored in a relational database is accessed by way of a user-defined query that is constructed in a query language such as SQL. Typically, for any given SQL query there are numerous procedural operations that need be performed on the data in order to carry out the objectives of the SQL query. For example, there may be numerous joins and table scans that need to be performed so as to accomplish the desired objective. These table joins and scans can often be executed in various different orders to arrive at the same result. A combination of procedural operations which accomplishes the desired objective is referred to as an "execution plan." There may be numerous execution plans that can be developed for any one SQL query.

A database management system must automatically select one execution plan to implement from the numerous execution plans that may exist for a SQL query. One frequently employed criteria for choosing an execution plan is to select the plan which provides the greatest efficiency, i.e. involves minimal use of system resources such as processing cycles and logical I/O's.

In database systems which select an execution plan based on efficiency, the system considers the table scans and table joins, as well as the ordering of these, that accomplish the desired objective with use of minimal system resources. Generally, a plan that requires processing a minimal number of database records also uses minimal system resources. Thus, a key principle for selecting the most efficient execution plan is to select the plan that minimizes the number of database records that need to be processed.

Database statistics play an essential role in identifying execution plans that require processing of minimal numbers of records. Generally, database systems can be programmed to generate statistics on data stored in particular index columns. Database statistics typically include the following: the time of the last statistics collection; the number of rows in the index; the number of pages occupied by the index; the average row length; the distribution of values in the indexed column (i.e. a histogram); the densities of values in the indexed column; and the number of rows used to produce the histogram and density information.

Query Analyzer

Figure 4:
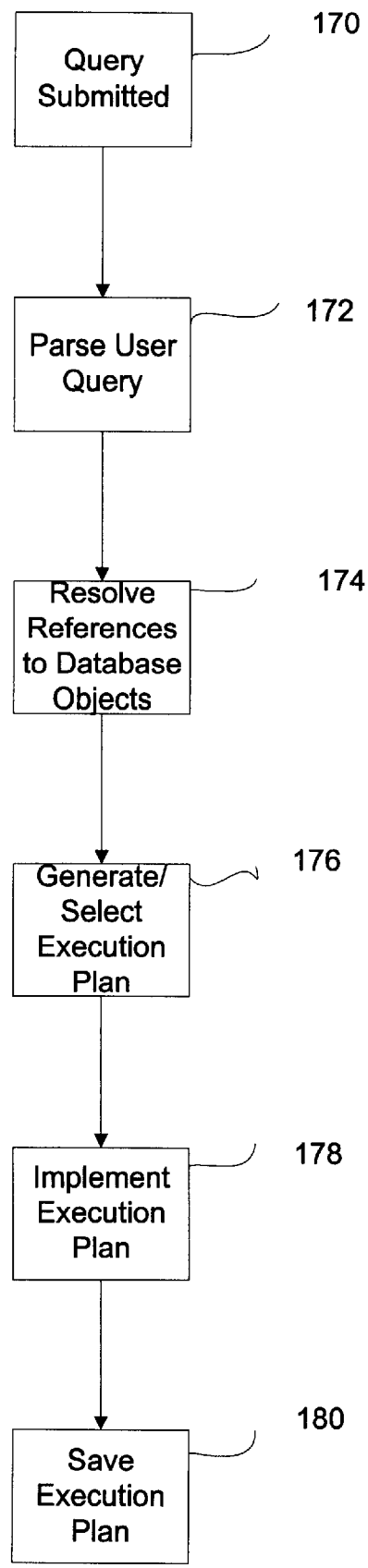
FIG. 4 is a high level flow diagram showing conventional compilation and execution of a submitted query, including generation of its execution plan.

FIG. 4 is a high level flow diagram showing conventional compilation and execution of a submitted query, including generation of its execution plan. By way of example, for the company database of FIG. 3, a user may desire to know the number of employees in each department of the corporation that is located in East Bedford. Accordingly, the user may submit at step 170 in FIG. 4 the following SQL query:

select dept.name, count (*) as num.employees
from Dept D join Empl E on D.dept_id=E.dept_id
where D.dept_id="east bedford"
group by dept_id At step 172, the database management system parses the SQL query, checking for proper SQL syntax and translating the SQL commands into a database internal format that can be operated upon. In one embodiment the internal format is of a form known in the art as a "sequence tree" or "query tree."

At step 174, the database management system resolves the text strings in the query tree with objects in the database and resolves information about those objects. For the above example, the strings "employee" and "department" are respectively bound to the employee and department tables in the database and the names and data types of the columns in those tables are resolved.

At step 176, a component of the database management system usually referred to as the "query optimizer" selects an optimal execution plan. Generally this is accomplished by first generating a plurality of execution plans, any one of which would fulfill the objectives of the SQL query. Thereafter, the query optimizer selects one of the execution plans, usually the one deemed to be most efficient. This process typically involves analyzing database statistics as described above to minimize the number of record accesses. As a consequence, it is important for the efficient operation of the database that the database statistics be accurate.

At step 178, the database system implements the execution plan that was selected at step 176. At step 180, the execution plan is stored in an area of memory referred to as the execution plan cache. On subsequent invocations of the same SQL query, rather than retraverse the optimization process, the previously optimized execution plan is retrieved from cache and executed.

Figure 5:
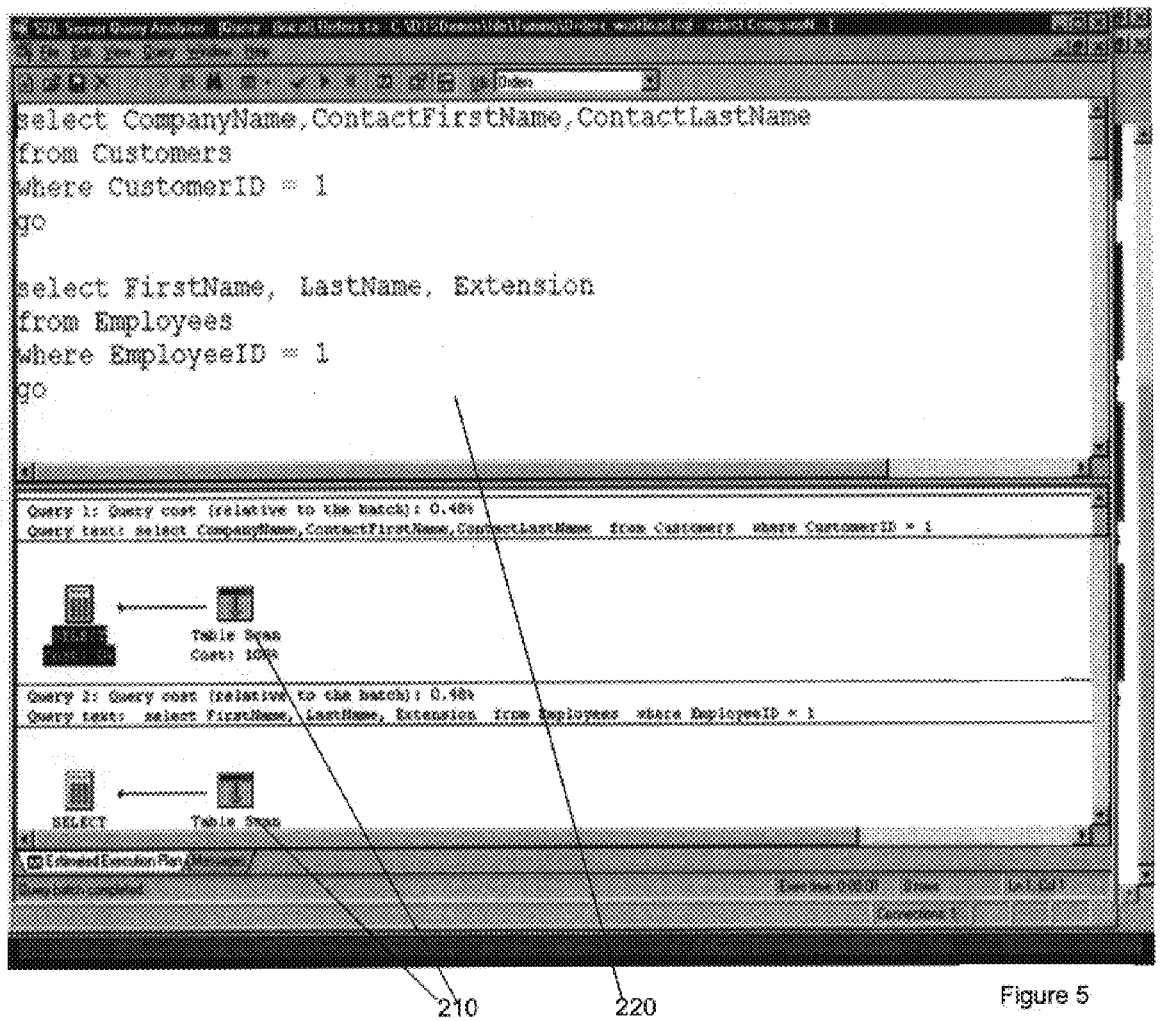
FIG. 5 depicts a user interface in accordance with one embodiment of the present invention, showing graphical analysis of two specified queries.

Turning now to the present graphical query analyzer, FIG. 5 depicts a user interface in accordance with one embodiment of the present invention, showing graphical analysis of two specified queries. A user at a conventional personal computer 20 specifies via a keyboard 40 a standard SQL query. In this case the query reads:

Select CompanyName, ContactFirstName, ContactLast Name
from Customers
Where CustomerID=1

Query analyzer interface element (365 on FIG. 1), an application program 36 comprising instructions in memory 22 executed by processing unit 21, causes the query to be displayed in a user interface window 220 shown on a display 47.

Figure 10:
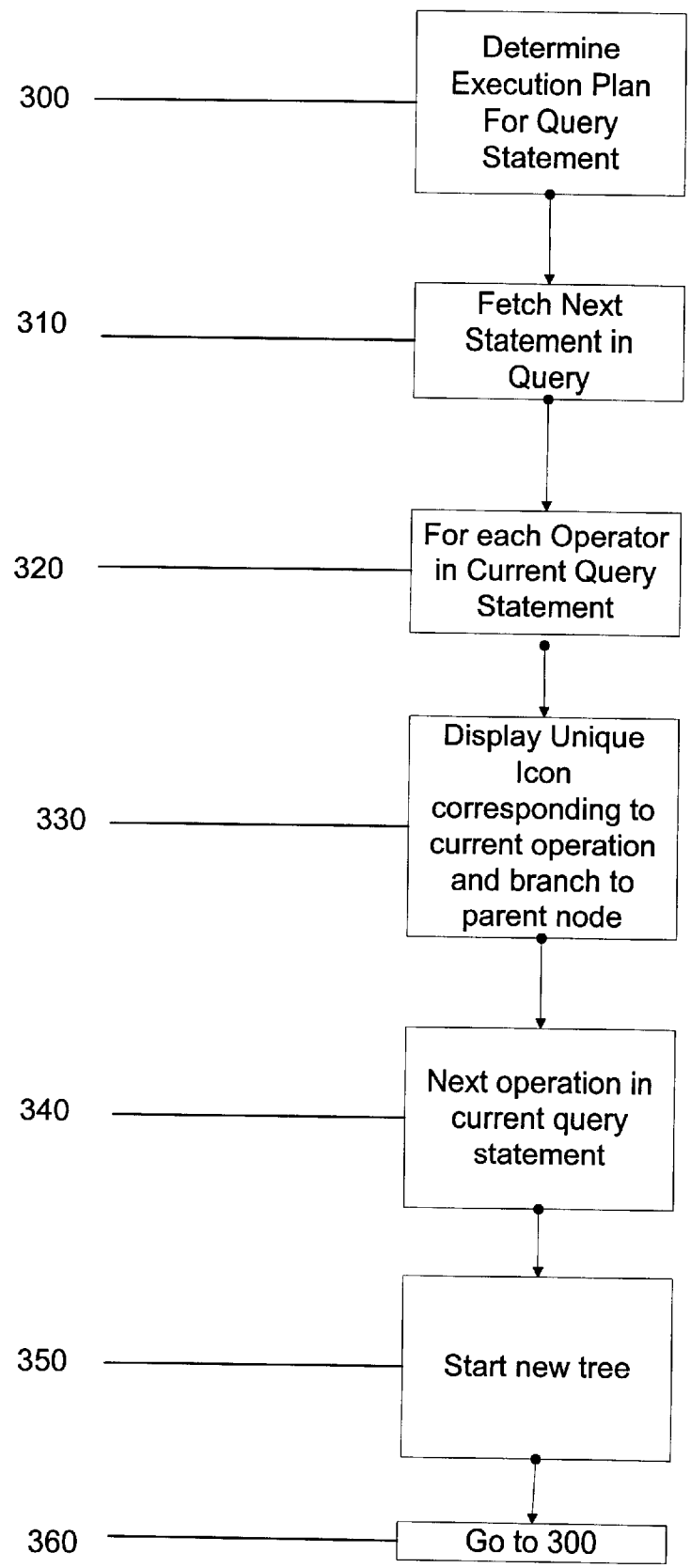
FIG. 10 is a high level flow diagram showing steps performed by one embodiment of the present invention to display a graphical analysis tree.

The user types the word "go" and the query is thereby submitted to a query analyzer element (370 on FIG. 1), also an application program 36 comprising instructions in memory 22 executed by the processing unit 21. Turning now to FIG. 10, in Step 300 in response to the submission, the query analyzer element 370 performs, or calls upon another application program 36 to perform, the steps shown in FIG. 4 to obtain an execution plan for the submitted query. Again, as discussed in connection with that Figure, the execution plan is obtained by running a "query optimizer" which selects the most efficient execution plan based on an analysis of database statistics and other information. However, the execution plan is not implemented or saved as with the database management system described in connection with FIG. 4.

Turning back to FIG. 10, in Steps 310 and 320, the query analyzer element 370 begins a loop for each operator in the execution plan determined in Step 300. The loop is nested within a loop for each statement in a query submitted, which in this case is trivial as only one "Select" statement was submitted In Step 330, the query analyzer element 370 causes the display of a unique icon corresponding to the operation currently considered in the loop. In particular the query analyzer element 370 may search for a corresponding icon in a table stored on the hard drive 27. The table would include all possible execution operations associated with corresponding icons.

In this step, the query analyzer element 370 also causes the display of the estimated cost, determined during the optimization process (Step 300), for the current operation as a percentage of the cost of the query. A tree branch to a parent operation (e.g., one that called the current operation) is also displayed.

In Step 340, the display step is repeated for each operation in the query execution plan determined in Step 300. In this way an intuitive, graphical analysis of execution of the current query is displayed in the form of a tree structure 210.

In Step 350, a new tree structure 210 is built (assuming another statement was submitted to the query analyzer interface 365 as part of the query). Step 360 causes repetition of steps for the new statement, beginning with generation of a new execution plan. In this way, a tree structure 210 representation of an execution plan (with associated cost), is displayed for each statement submitted by a user to the query analyzer interface element 365.

Turning back to FIG. 5, a tree structure 210 is displayed representing the execution plan for the query submitted by the user. The tree structure 210 consists an icon identifying the query (i.e., in this case a "Select" statement) and an icon identifying the single operation in the associated execution plan (i.e., here "Table Scan"). As the relevant execution plan consists of only one operation, the display shows the cost of the table scan operation as 100% of the cost of the query.

However, as the display considered in this example shows, the relevant user has submitted a second query to the query analyzer interface 365. Here the query reads:

Select FirstName, LastName, Extension
from Employees
Where EmployeeID=1

Again, the user also types "go," and the second query is submitted to the query analyzer element 370. The query analyzer element 370 accordingly displays a tree structure 210 corresponding to the execution plan associated with the submitted query. Here again, the execution plan consists one Table Scan operation costing 100% of the query cost. As depicted in FIG. 5, the approximate cost of each query as a percentage of batch total is also shown.

Figure 6:
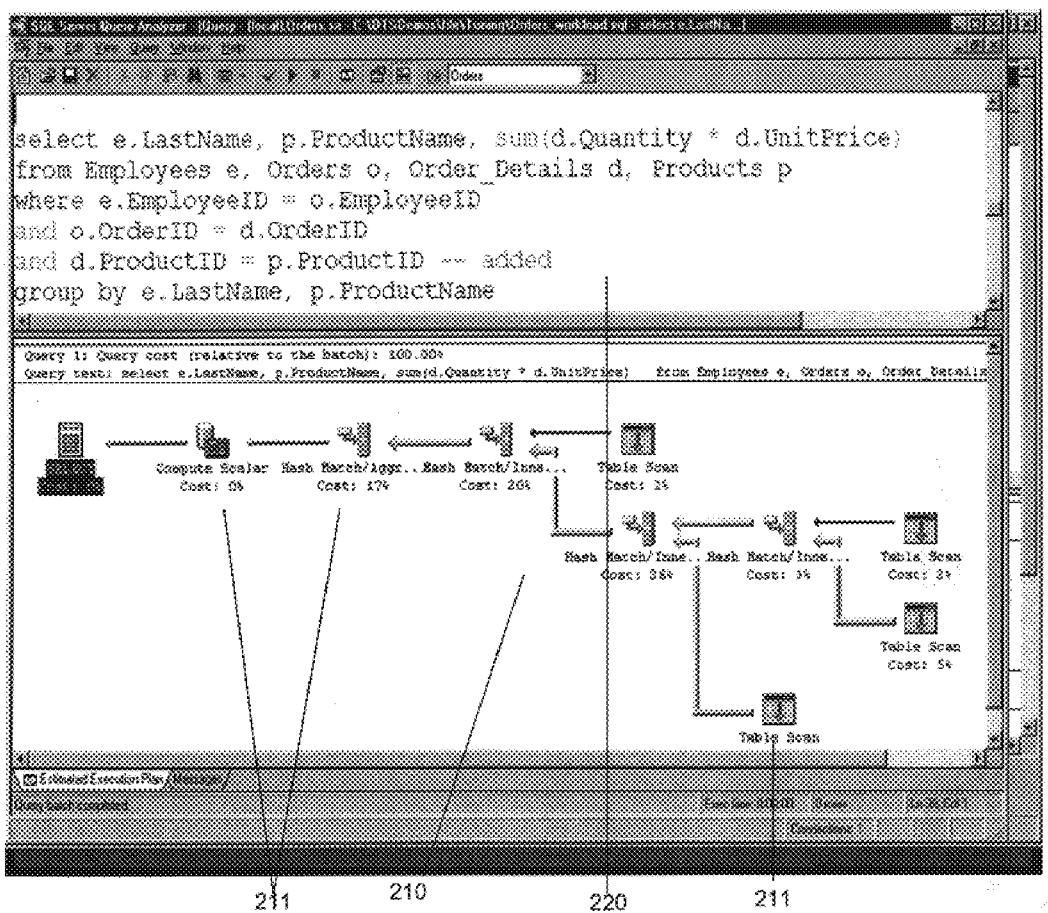
FIG. 6 depicts a user interface in accordance with one embodiment of the present invention, showing graphical analysis of one specified query with multiple operations.

By way of further example, FIG. 6 depicts a user interface in accordance with one embodiment of the present invention, showing graphical analysis of one specified query with multiple operations. Here the submitted query, shown in the query analyzer interface window 220, reads:

select e.Lastname, p.ProductName, sum (d.Quantity*d.UnitPrice)
from Employees e, Orders o, Order_)details d, Products p
where e.EmployeeID=o.EmployeeID
and o.OrderID=d.OrderID
and d.ProductID=p.ProductID
group by e.LastName, p.ProductName Here again the query analyzer element 370 displays a tree structure 210 representing the execution plan associated with the specified SQL query. Three tree 210 consists of operation node icons 211 each representing an operation in the execution plan. Here, the plan includes Hash Match, scalar computation and Table Scan operations. Each operation corresponds to a unique operation node icon 211.

Again, the display shows the cost of each operation as a percentage of the total query cost. In FIG. 6, these costs are also conveyed graphically as each arrow pointing from an operation node icon 211 is drawn such that it's width bears a logarithmic correspondence to the operation's cost.

Note that the tree structure 210 displayed in FIG. 6 is read from right to left. However, branches with arrowheads pointing to a parent node are displayed as connections to a corresponding child node (i.e., which is to the right of the parent).

Also, in the presently described embodiment, where the query statement submitted is an SQL statement (e.g., Select, Insert, Delete), an icon representing the SQL statement is shown as the root of the tree structure 211. Similarly, if the submitted statement is a Transact SQL statement or stored procedure, then a representation of such a statements is instead displayed at the root (i.e. the parent-less node) of the tree structure 210. Thus, as displayed in FIG. 6, the Select statement causes the execution of the scalar computation, hash match and other procedures which in turn may call other procedures, displayed as children in the tree structure 210, and so on.

Figure 7:
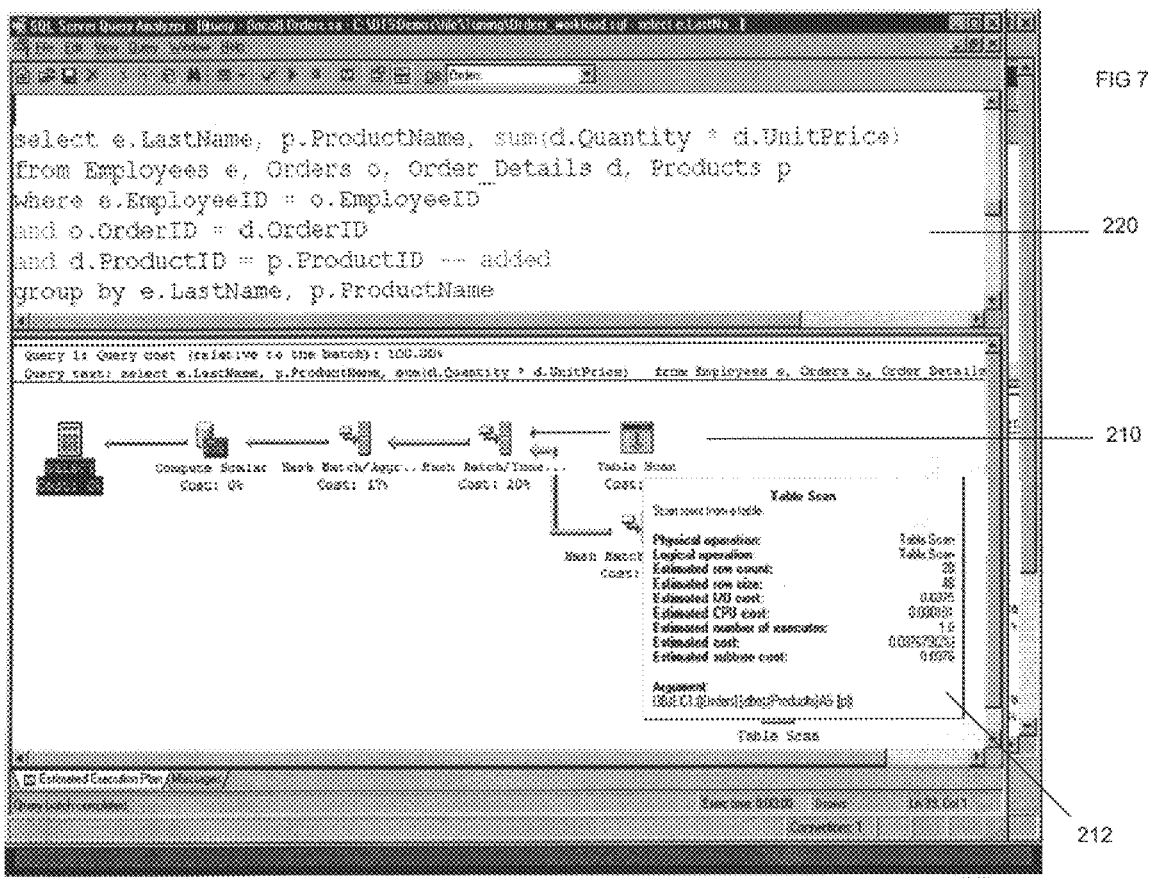
FIG. 7 depicts the graphical analysis depicted in FIG. 5 with additional cost statistics displayed as a result of operation icon selection.
Figure 11:
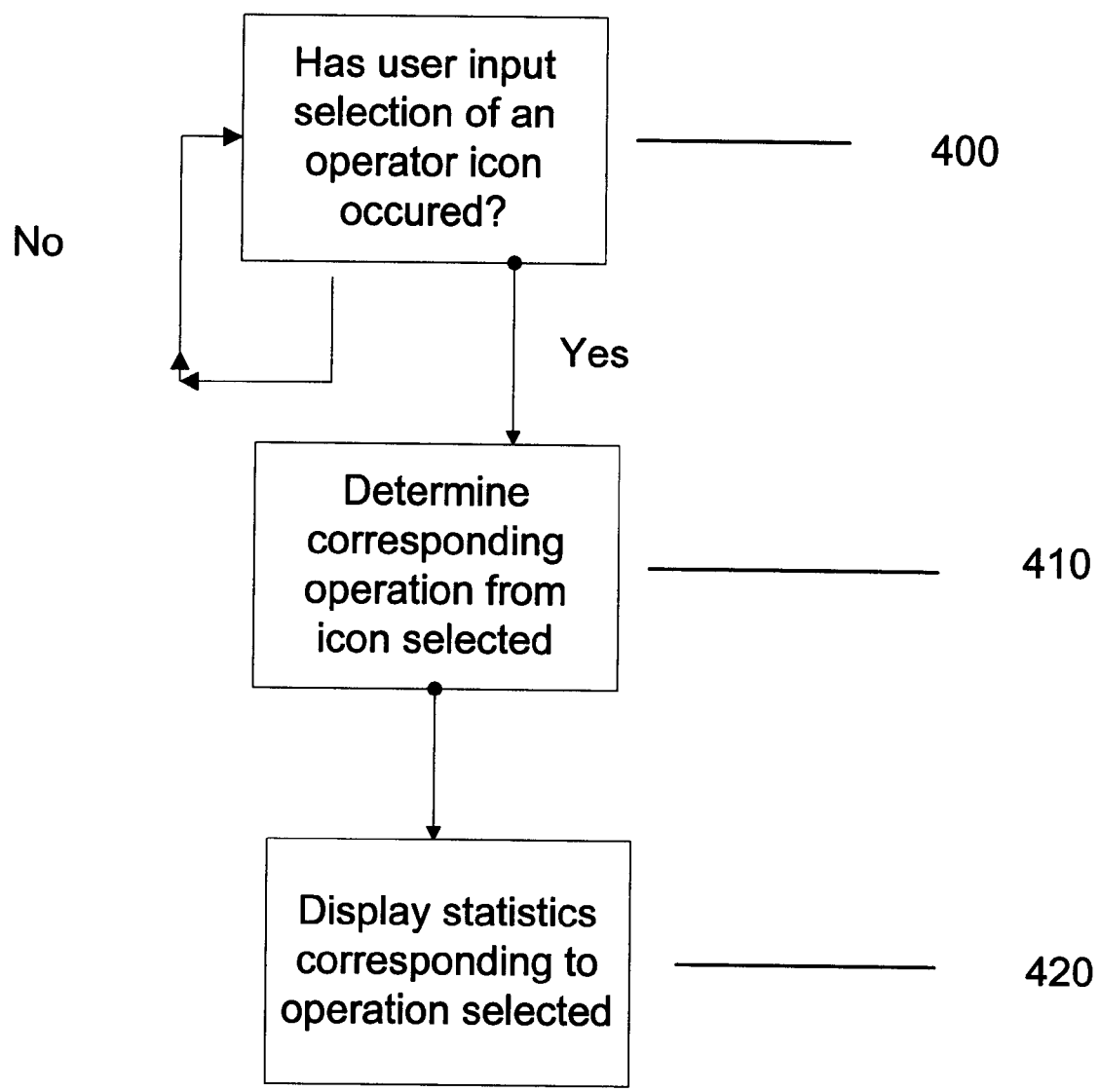
FIG. 11 is a high level flow diagram showing steps performed by one embodiment of the present invention to allow user selection of more detailed execution statistics relating to a particular query operation.

By way of further example of features which may characterize the present invention, FIG. 7 depicts the tree structure 210 displayed in FIG. 5 with additional cost statistics displayed as a result of operation node icon 211 selection. Here, the user has selected a Table Scan operation icon with a conventional mouse device 42 by pointing and clicking. As a result, the query analyzer element 370 shows a detailed statistics window 212 showing expected execution statistics specific to the Table Scan operation selected In particular, FIG. 11 is a high level flow diagram showing steps performed by one embodiment of the query analyzer element 370 to allow such selection of more detailed execution statistics relating to a particular query operation. Briefly, in Step 400 the query analyzer element checks whether a conventional mouse 42 selection of an operation node icon 211 has occurred. If it has not, Step 400 is repeated.

When the selection event does occur, in Step 410 the query analyzer element 370 associates the selected icon with a corresponding operation as discussed earlier. In addition, a database table stored on the hard drive 27 includes records with fields associating each operation in the execution plan with specific execution statistics corresponding to the operation. Again, these execution statistics are calculated and stored during the optimization (Step 300, FIG. 10). Thus, in Step 420, the query analyzer element 370 searches the execution statistics table with the selected operation, and displays the results of the search.

Turning again to FIG. 7, it shows the types of detailed statistics which a graphical analyzer element 370 in accordance with one embodiment of the present invention is capable of displaying. Here, the detailed statistics window shows 1) the physical operation selected; 2) a logical query operator corresponding to the physical operation (i.e. "physical operation" refers to an implementation algorithm, while logical operation refers to a relational algebraic evaluation used by the algorithm to the extent one exists); 3) the expected number of table rows output by the operation; 4) the expected row size of the rows output by the operation; 5) the expected cost of all I/O activity caused by the operation; 6) the expected cost of all CPU activity caused by the operation; 7) the number of times the operation will be executed during query implementation; 8) the expected subtree cost of the operation (i.e., the cost of the operation plus the cost of all the operations in the subtree child of the operation); and 9) the predicates and parameters ("Argument") used by the query.

Figure 8:
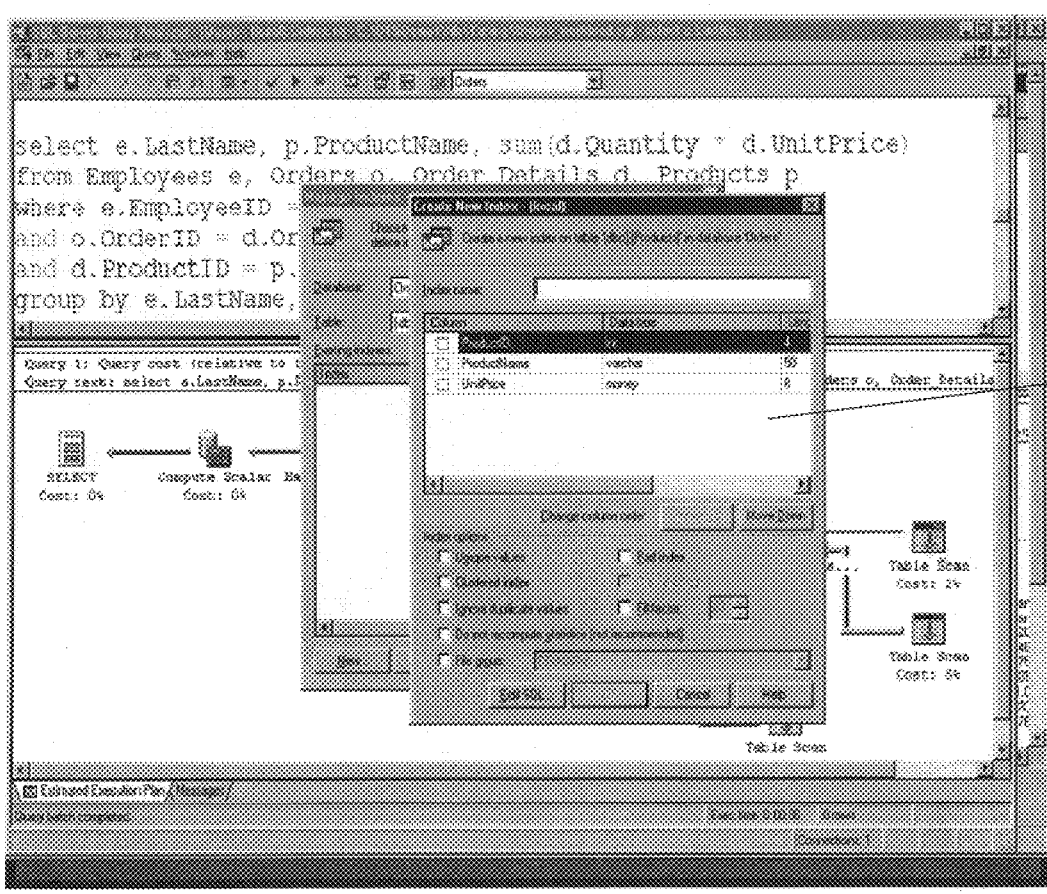
FIG. 8 depicts a user interface in accordance with one embodiment of the present invention, wherein a user is prompted with the choice to add an additional database index.
Figure 9:
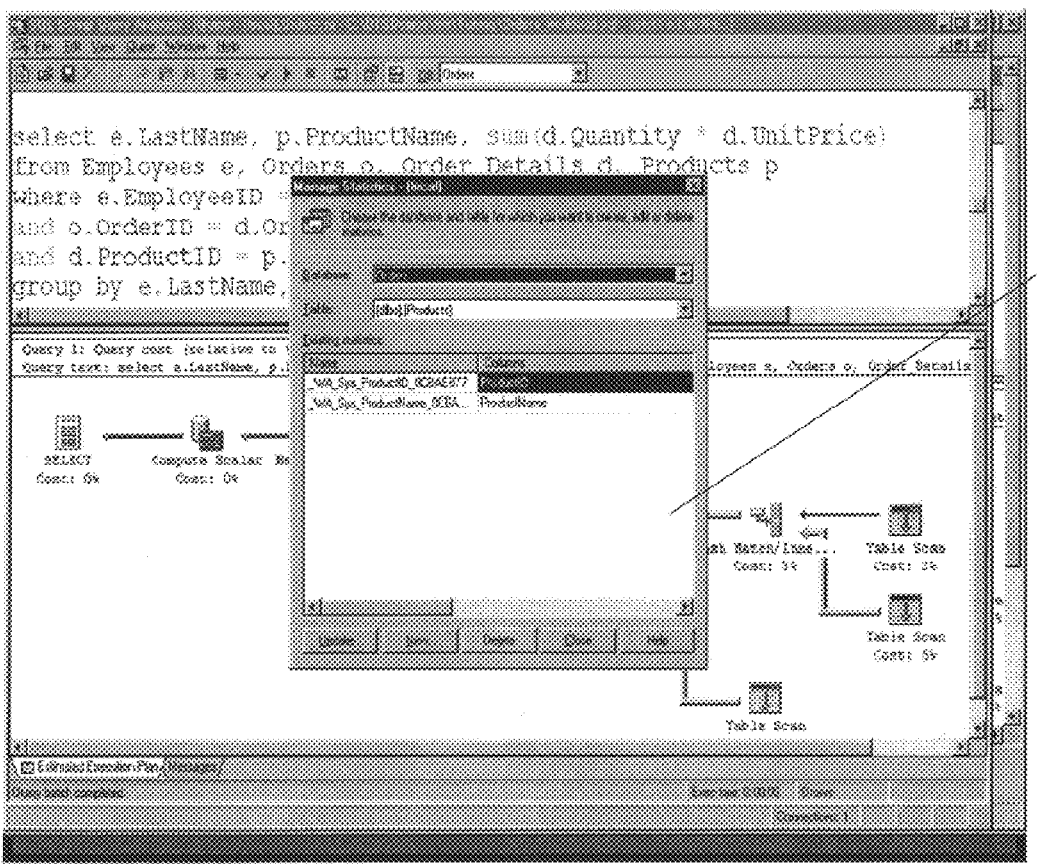
FIG. 9 depicts a user interface in accordance with one embodiment of the present invention, wherein a user is prompted with the choice to add an additional database statistic.

Turning now to FIG. 8, it shows a user interface in accordance with one embodiment of the present invention, wherein a user is prompted with the choice to add an additional database index. Advantageously, in accordance with one embodiment of the query analyzer element 370 of the present invention, a detection element detects when indices or statistics are missing from the database tables involved in the displayed execution plan. Upon such detection, the query analyzer element 370 prompts the user with a New Index window 215, allowing the user to create a new index on a given column of a database table. Similarly, FIG. 9 shows a display wherein the user is prompted with new statistic window 216, allowing the addition and storage of additional database statistics upon detection of the absence of such statistics.

In addition, in accordance with another embodiment of the present invention, the graphical display of the present invention may be enabled during normal application execution (i.e. Step 178 of FIG. 4). In that case, displayed detailed cost estimates of operations will in fact equal actual executed costs. By choosing this option, a developer may be more likely to trouble-shoot the cause of a problem which manifests itself during such normal application use.

Those skilled in the art understand that computer readable instructions for performing the above described processes can be generated and stored on a computer readable medium such as a magnetic disk or CD-ROM. Further, a computer such as that described with reference to FIG. 1 may be arranged with other similarly equipped computers in a network, and each computer may be loaded with computer readable instructions for performing the above described processes. Specifically, referring to FIG. 1, microprocessor 21 may be programmed to operate in accordance with the above described processes.

While the invention has been described and illustrated with reference to specific embodiments, those skilled in the art will recognize that modification and variations may be made without departing from the principles of the invention as described above and set forth in the following claims. In particular, the invention may employed with any type of database including those not in relational format. Further, the invention may be employed in any database that uses statistics in any way to select a plan for processing a user defined query. Also, the statistics may be of any type and are not limited to those described above. Indeed, the statistics may be derived for single columns of data, multiple columns of data or for any other division of data. Accordingly, reference should be made to the appended claims as indicating the scope of the invention.

What is claimed is:

1. A computer system, the computer system including a processing unit, a user input device coupled to the processing unit and display device coupled to the processing unit, the computer system also including:

a user interface element comprising instructions executed by the processing unit, the user interface element capable of accepting a database query, the database query specified via the user input device; and a query analyzer element comprising instructions executed by the processing device, the query analyzer element causing to be displayed on the display device a tree structure corresponding to an execution plan associated with the database query, the execution plan associated with the database query comprising at least one operation, the tree structure comprising nodes connected by tree connectors, each of said nodes representing a corresponding one of the at least one operation of the execution plan associated with the database query.

2. The computer system of claim 1 wherein for each one of the at least one operation of the execution plan associated with the database query, the query analyzer element also causes to be displayed on the display device a percentage execution cost corresponding to the one operation, the percentage execution cost being equal to a cost of the one operation as a percentage of a total query cost.

3. The computer system of claim 1 wherein the query analyzer element also includes a detection element comprising instructions executed by a processing device, the detection element detecting the absence of a database column index and prompting a user on the display device for the addition of the database column index.

4. The computer system of claim 1 wherein the query analyzer element also includes a detection element comprising instructions executed by a processing device, the detection element detecting the absence of a database statistic and prompting a user on the display device for the addition of the database statistic.

5. The computer system of claim 1 wherein said nodes are represented on the display device by operation icons, the operation icons each uniquely representing a query operation.

6. The computer system of claim 1 wherein the width of the tree connectors bears a mathematical relationship to a cost of one of the at least one operation of the execution plan associated with the database query.

7. The computer system of claim 6 wherein the mathematical relationship is a logarithmic relationship.

8. A computer based method for providing a graphical cost analysis of a user specified query, the computer based method comprising:

a. determining an execution plan for the user specified query;
 b. displaying on a display device a tree structure representation of the specified query, the tree structure representation comprising icon nodes connected by arrow representations, the icon nodes each corresponding to one of query operations which comprise the execution plan, each arrow representation having a width bearing a mathematical relationship to an execution cost of one of the query operations corresponding to an icon node from which the arrow representation originates;
 c. checking for user selection of one of the icon nodes via a user input device; and
 d. in the event of user selection of one of the icon nodes, displaying on the display device additional cost statistics for the query operation corresponding to the one of the icon nodes selected.

9. The computer based method of claim 8 wherein the additional cost statistics include an estimated row count.

10. The computer based method of claim 9 wherein the additional cost statistics include an estimated row size.

11. The computer based method of claim 10 wherein the additional cost statistics include an estimated I/O cost.

12. The computer based method of claim 11 wherein the additional cost statistics include an estimated CPU cost.

13. The computer based method of claim 12 wherein the additional cost statistics include an estimated number of executes.

14. The computer based method of claim 13 wherein the additional cost statistics include an estimated subtree cost.

15. The computer based method of claim 14 wherein the additional cost statistics include an argument indicator.

16. The computer based method of claim 8 wherein the mathematical relationship is a logarithmic relationship.

17. The computer based method of claim 8 wherein the user input device is a mouse device.

18. The computer based method of claim 8 also comprising the step of displaying a percentage cost of each of the query operations in relation to a total query cost.

* * * * *